United States Patent
Shui-Yuan et al.

(10) Patent No.: US 8,623,252 B2
(45) Date of Patent: Jan. 7, 2014

(54) METHOD FOR MANUFACTURING THERMOPLASTIC RESIN PRE-IMPREGNATED FIBER STRUCTURE

(75) Inventors: Ma Shui-Yuan, Taichung (CN); Ling-Ling Cheng, Taipei (CN)

(73) Assignee: Catcher Technology Co., Ltd., Tainan (TW)

( * ) Notice: Subject to any disclaimer, the term of this patent is extended or adjusted under 35 U.S.C. 154(b) by 202 days.

(21) Appl. No.: 13/133,658

(22) PCT Filed: Jan. 9, 2009

(86) PCT No.: PCT/CN2009/000034
§ 371 (c)(1),
(2), (4) Date: Jun. 9, 2011

(87) PCT Pub. No.: WO2010/078697
PCT Pub. Date: Jul. 15, 2010

(65) Prior Publication Data
US 2011/0254193 A1 Oct. 20, 2011

(51) Int. Cl.
*B29C 45/14* (2006.01)
*B29C 65/02* (2006.01)
(52) U.S. Cl.
USPC ........... 264/160; 264/162; 264/258; 264/275; 264/294

(58) Field of Classification Search
None
See application file for complete search history.

(56) References Cited

U.S. PATENT DOCUMENTS

| | | | |
|---|---|---|---|
| 5,080,851 A * | 1/1992 | Flonc et al. | 264/258 |
| 6,203,737 B1 * | 3/2001 | Zurbuchen | 264/153 |
| 7,014,806 B2 * | 3/2006 | Edelmann et al. | 264/152 |
| 2005/0255311 A1* | 11/2005 | Formella | 428/323 |
| 2006/0113706 A1* | 6/2006 | Chevin et al. | 264/258 |

* cited by examiner

*Primary Examiner* — Edmund H. Lee

(57) ABSTRACT

A process of manufacturing a fibrous article includes submerging a fiber substrate in a bath of first thermoplastic resin to impregnate the fiber substrate with the first thermoplastic resin; heating the fiber substrate until the fiber substrate becomes a thick continuous fiber substrate; cutting the thick continuous fiber substrate into units; stacking the fiber substrate units; pressing and heating the stacked fibrous structure units until a stacked fibrous structure is formed; heating a mold; conveying the stacked fibrous structure to the mold to melt; cooling the mold to shape the molten fibrous structure into a half-finished article; removing the half-finished article out of the mold; eliminating burrs and sharp edges of the half-finished article; conveying the half-finished article to the mold; and uniformly applying a molten second thermoplastic resin on an inner surface of the half-finished article by injection molding to produce the finished fibrous article.

5 Claims, 7 Drawing Sheets

METHOD FOR MANUFACTURING THERMOPLASTIC RESIN PRE-IMPREGNATED FIBER STRUCTURE

BACKGROUND OF THE INVENTION

1. Field of the Invention

The invention relates to the manufacture of fibrous articles and more particularly to a method for manufacturing thermoplastic resin pre-impregnated fiber structure.

2. Description of Related Art

Environmental protection is a practice of protecting the environment, on individual, organizational or governmental level, for the benefit of the natural environment and/or humans. Due to the pressures of population and technology the biophysical environment is being degraded, sometimes permanently. Thus, many governments in the world began placing restraints on activities that caused environmental degradation. Further, activism by the environmental movement has created awareness of the various environmental issues.

Fiber-reinforced plastic (FRP) is a composite material made of a polymer matrix reinforced with fibers. The fibers are usually fiberglass, carbon, or aramid, while the polymer is usually an epoxy, vinylester or polyester thermosetting plastic. FRPs are commonly used in the aerospace, automotive, marine, and construction industries. FRPs are a category of composite plastics that specifically use fibrous materials to mechanically enhance the strength and elasticity plastics. The original plastic material without fiber reinforcement is known as the matrix. The matrix is a tough but relatively weak plastic that is reinforced by stronger stiffer reinforcing filaments or fibers. The extent that strength and elasticity are enhanced in a FRP depends on the mechanical properties of both the fiber and matrix, their volume relative to one another, and the fiber length and orientation within the matrix.

Thermosetting plastic is polymer material that irreversibly cures. The cure may be done through heat, through a chemical reaction, or irradiation such as electron beam processing.

Thermoset materials are usually liquid or malleable prior to curing and designed to be molded into their final form, or used as adhesives. However, typical processes of manufacturing fibrous articles of thermoset materials are disadvantageous because additional steps such as filling surface cavities and polishing surface are required. This can adversely increase the manufacturing time and cost. Further, pollution often occurs.

A conventional process of manufacturing fibrous articles impregnated with thermoset resin is disadvantageous due to high energy consumption, time consuming steps, and low quality.

To the worse, thermoset materials are difficult of being recycled. Its disposal can cause pollution (e.g., air pollution) to the environment even by using the advanced technology.

A method for manufacturing thermoplastic resin pre-impregnated fibrous structure of the invention is neither taught nor rendered obvious thereby. In addition, the method of the invention can eliminate drawbacks associated with the prior art techniques.

SUMMARY OF THE INVENTION

It is therefore one object of the invention to provide a process of manufacturing a fibrous article comprising the steps of submerging a fiber substrate in a bath of first thermoplastic resin to impregnate the fiber substrate with the first thermoplastic resin; heating the fiber substrate at a first temperature until the fiber substrate becomes a thick continuous fiber substrate; cutting the thick continuous fiber substrate into a plurality of units of predetermined size; stacking a predetermined number of the fiber substrate units; pressing and heating the stacked fibrous structure units at a second temperature until a stacked fibrous structure is formed; heating a mold to a third temperature; conveying the stacked fibrous structure to the mold to melt; cooling the mold to harden the molten fibrous structure into a half-finished article of a predetermined shape; removing the half-finished article out of the mold; eliminating burrs and sharp edges of the half-finished article; conveying the half-finished article to the mold; and uniformly applying a molten second thermoplastic resin on an inner surface of the half-finished article by injection molding in the mold to produce the finished fibrous article having a second thermoplastic resin layer on an inner surface.

The above and other objects, features and advantages of the invention will become apparent from the following detailed description taken with the accompanying drawings.

DETAILED DESCRIPTION OF THE INVENTION

Figure 1:
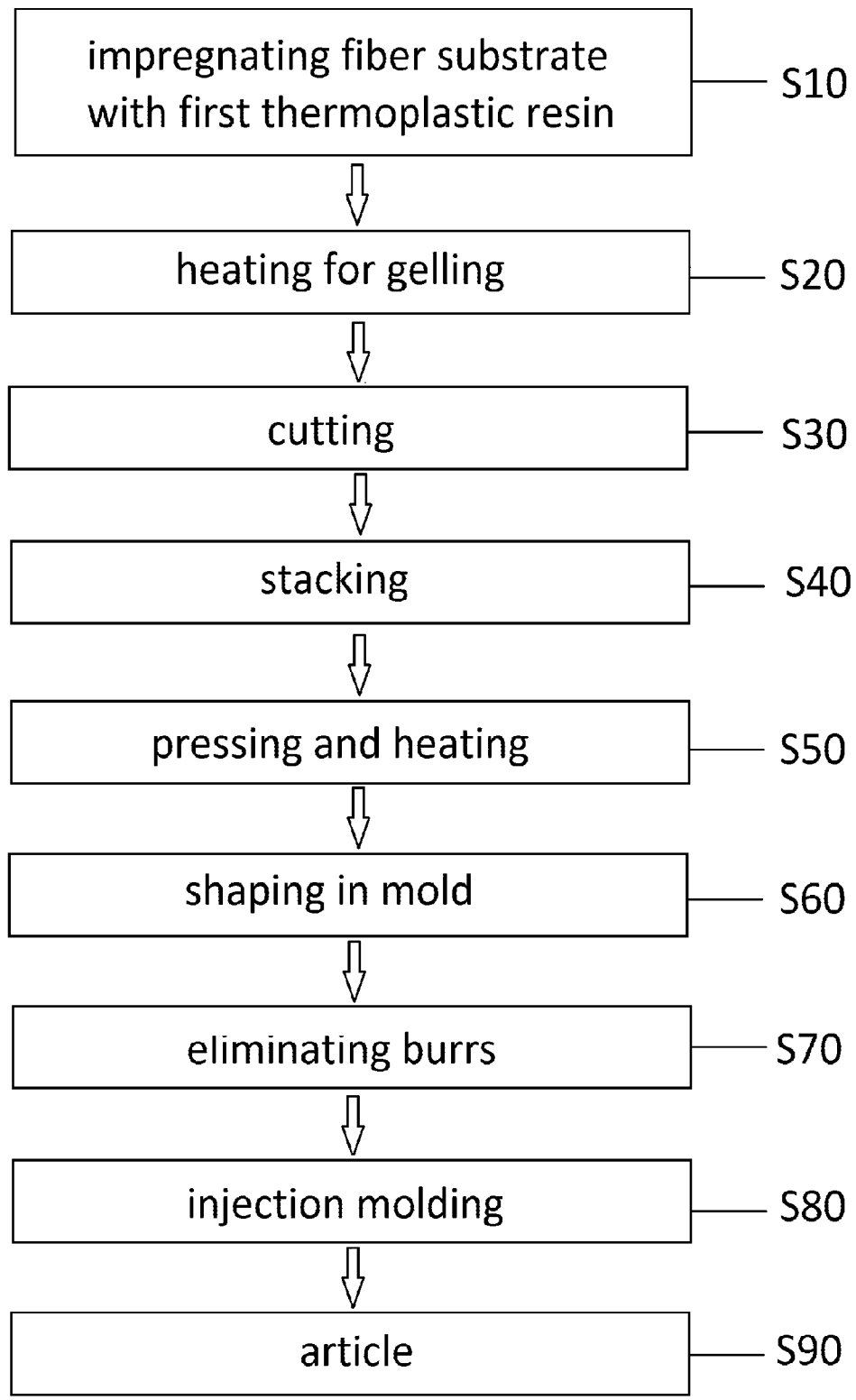
FIG. 1 is a flowchart depicting a process of manufacturing a fibrous article according to a first preferred embodiment of the invention.

Referring to FIG. 1, a process of manufacturing a fibrous article in accordance with a first preferred embodiment of the invention is illustrated. The process comprises the following steps:

In step S10, a fiber substrate is submerged in a bath of first thermoplastic resin so as to form a fiber substrate impregnated with the first thermoplastic resin and coated with a first thermoplastic resin layer.

In step S20, the fiber substrate is heated at a temperature in a range of 60° C. to 80° C. until the fiber substrate becomes a thick continuous fiber substrate.

In step S30, the thick continuous fiber substrate is cut into a plurality of units of predetermined size.

In step S40, the fiber substrate units of predetermined number are stacked.

In step S50, the stacked fibrous structure units are pressed by a hydraulic press and heated at a temperature in a range of 25° C. to 150° C. until a continuous layered fibrous structure is formed.

In step S60, a mold is heated to a temperature of between 180° C. and 230° C., the continuous layered fibrous structure is conveyed to the mold to melt, the mold is cooled to cause the molten fibrous structure to form a half-finished article of a predetermined shape with concave surface(s), convex surface(s), opening(s), etc. Therein, and the half-finished article is removed out of the mold.

In step S70, burrs and sharp edges of the half-finished article are eliminated by means of CNC (computer numerical control).

In step S80, a molten second thermoplastic resin is uniformly applied on an inner surface of the half-finished article by injection molding in the mold.

In step S90, a fibrous article impregnated with the first thermoplastic resin and coated with the second thermoplastic resin is finished.

Material of the first thermoplastic resin is selected from the group consisting of ABS (acrylonitrile butadiene styrene), PS (polystyrene), PC (polycarbonate), PE (polyethylene), AS (acrylonitrile styrene), PMMA (polymethyl methacrylate), PET (polyethylene terephthalate), PA (polyamide), PBT (polybothlene terephalate), PEEK (polyether ether ketone), and PEI (polyetherimide).

Material of the fiber substrate is selected from the group consisting of carbon fiber, glass fiber, asbestos fiber, engineering plastic fiber, and natural fiber.

Material of the second thermoplastic resin is selected from the group consisting of ABS, PS, PC, PE, AS, PMMA, PET, PA, PBT, PEEK, PEI, and an additive such as at least one of Talcum powder, carbon fiber, and glass fiber.

Figure 2:
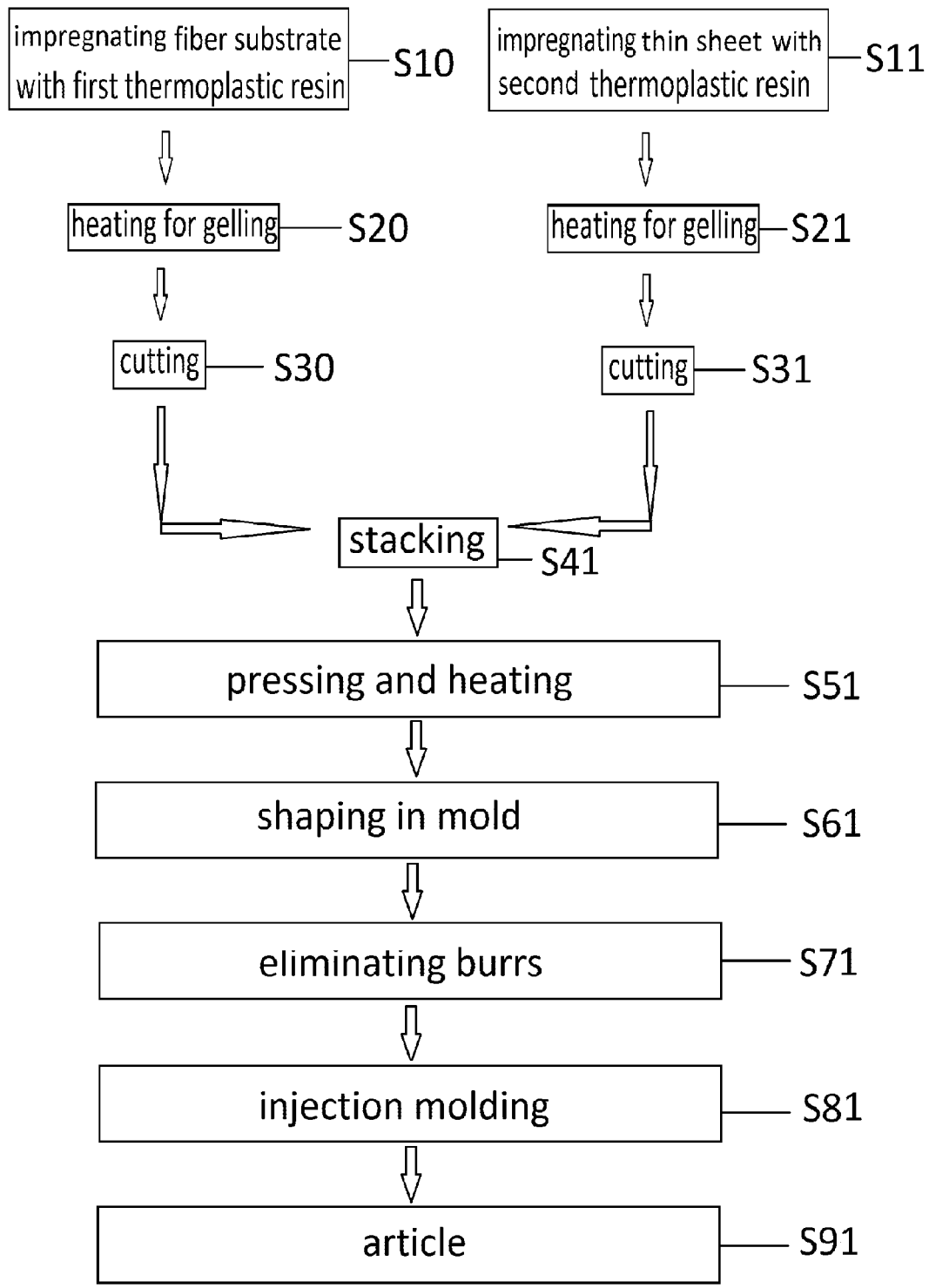
FIG. 2 is a flowchart depicting a process of manufacturing a fibrous article according to a second preferred embodiment of the invention.

Referring to FIG. 2, a process of manufacturing a fibrous article in accordance with a second preferred embodiment of the invention is illustrated. The process comprises the following steps:

In step S10, a fiber substrate is submerged in a bath of first thermoplastic resin so as to form a fiber substrate impregnated with the first thermoplastic resin and coated with a first thermoplastic resin layer.

In step S20, the fiber substrate is baked at a temperature in a range of 60° C. to 80° C. until the fiber substrate becomes a thick continuous fiber substrate.

In step S30, the thick continuous fiber substrate is cut into a plurality of units of predetermined size.

In step S11, a thin sheet is submerged in a bath of second thermoplastic resin so as to form a thin sheet impregnated with the second thermoplastic resin and coated with a first thermoplastic resin layer.

In step S21, the thin sheet is heated at a temperature in a range of 60° C. to 80° C. until the thin sheet becomes a thick continuous thin sheet.

In step S31, the thick continuous thin sheet is cut into a plurality of units of predetermined size.

In step S41, the fiber substrate units of predetermined number are stacked and then the thin sheet units of predetermined number are stacked on the stacked fibrous structure units.

In step S51, the stacked fibrous structure and thin sheet units are pressed by a hydraulic press and heated at a temperature in a range of 25° C. to 150° C. until a continuous layered fibrous structure is formed.

In step S61, a mold is heated to a temperature of between 180° C. and 230° C., the continuous layered fibrous structure is conveyed to the mold to melt, the mold is cooled to cause the molten fibrous structure to form a half-finished article of a predetermined shape with concave surface(s), convex surface(s), opening(s), etc. Therein, and the half-finished article is removed out of the mold.

In step S71, burrs and sharp edges of the half-finished article are eliminated by means of CNC.

In step S81, a molten third thermoplastic resin is uniformly applied on an inner surface of the half-finished article by injection molding in the mold.

In step S91, a fibrous article impregnated with both the first and the second thermoplastic resins and coated with the third thermoplastic resin is finished.

Material of each of the first and second thermoplastic resins is selected from the group consisting of ABS, PS, PC, PE, AS, PMMA, PET, PA, PBT, PEEK, and PEI.

Material of the third thermoplastic resin is selected from the group consisting of ABS, PS, PC, PE, AS, PMMA, PET, PA, PBT, PEEK, PEI, and an additive such as at least one of Talcum powder, carbon fiber, and glass fiber.

Material of the fiber substrate is selected from the group consisting of carbon fiber, glass fiber, asbestos fiber, engineering plastic fiber, and natural fiber.

Material of the thin sheet is selected from the group consisting of bamboo, wood, fabric, metal, leather, etc.

Figure 3:
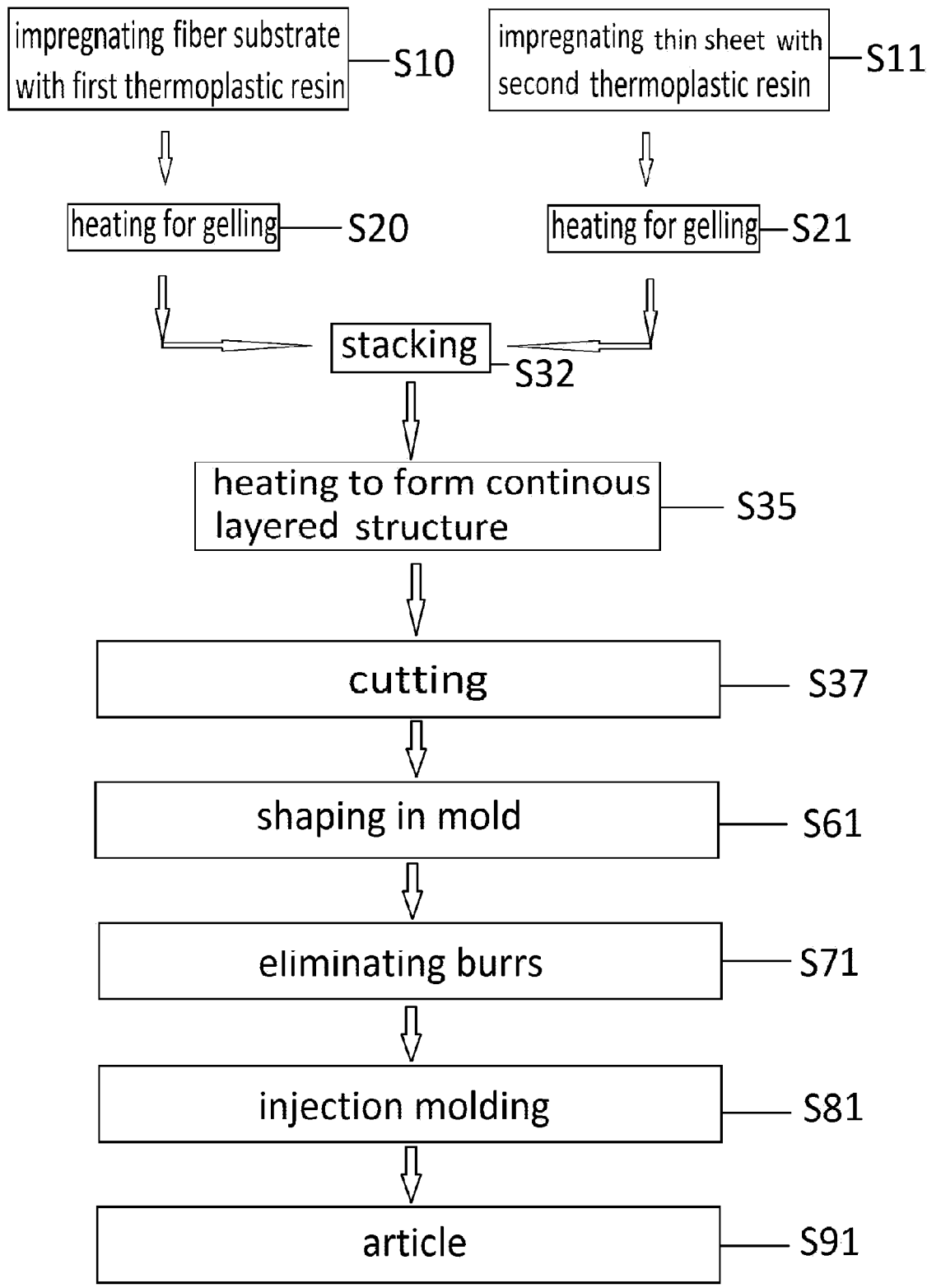
FIG. 3 is a flowchart depicting a process of manufacturing a fibrous article according to a third preferred embodiment of the invention.

Referring to FIG. 3, a process of manufacturing a fibrous article in accordance with a third preferred embodiment of the invention is illustrated. The process comprises the following steps:

In step S10, a fiber substrate is submerged in a bath of first thermoplastic resin so as to form a fiber substrate impregnated with the first thermoplastic resin and coated with a first thermoplastic resin layer.

In step S20, the fiber substrate is baked at a temperature in a range of 60° C. to 80° C. until the fiber substrate becomes a thick continuous fiber substrate.

In step S11, a thin sheet is submerged in a bath of second thermoplastic resin so as to form a thin sheet impregnated with the second thermoplastic resin and coated with a first thermoplastic resin layer.

In step S21, the thin sheet is heated at a temperature in a range of 60° C. to 80° C. until the thin sheet becomes a thick continuous thin sheet.

In step S31, the thick continuous thin sheet is stacked on the thick continuous fiber substrate.

In step S35, the stacked thin sheet and fiber substrate are heated at a temperature in a range of 25° C. to 150° C. until a continuous layered structure is formed.

In step S37, the continuous layered structure is cut into a plurality of units of predetermined size.

In step S61, a mold is heated to a temperature of between 180° C. and 230° C., the layered structure units of predetermined number are conveyed to the mold to melt, the mold is cooled to cause the molten layered structure units to form a half-finished article of a predetermined shape with concave surface(s), convex surface(s), opening(s), etc. Therein, and the half-finished article is removed out of the mold.

In step S71, burrs and sharp edges of the half-finished article are eliminated by means of CNC.

In step S81, after conveying the half-finished article to the mold again, a molten third thermoplastic resin is uniformly applied on an inner surface of the half-finished article by injection molding in the mold.

In step S91, a fibrous article impregnated with both the first and the second thermoplastic resins and coated with the third thermoplastic resin is finished.

Material of each of the first and second thermoplastic resins is selected from the group consisting of ABS, PS, PC, PE, AS, PMMA, PET, PA, PBT, PEEK, and PEI.

Material of the third thermoplastic resin is selected from the group consisting of ABS, PS, PC, PE, AS, PMMA, PET, PA, PBT, PEEK, PEI, and an additive such as at least one of Talcum powder, carbon fiber, and glass fiber.

Material of the fiber substrate is selected from the group consisting of carbon fiber, glass fiber, asbestos fiber, engineering plastic fiber, and natural fiber.

Material of the thin sheet is selected from the group consisting of bamboo, wood, fabric, metal, leather, etc.

Figure 4:
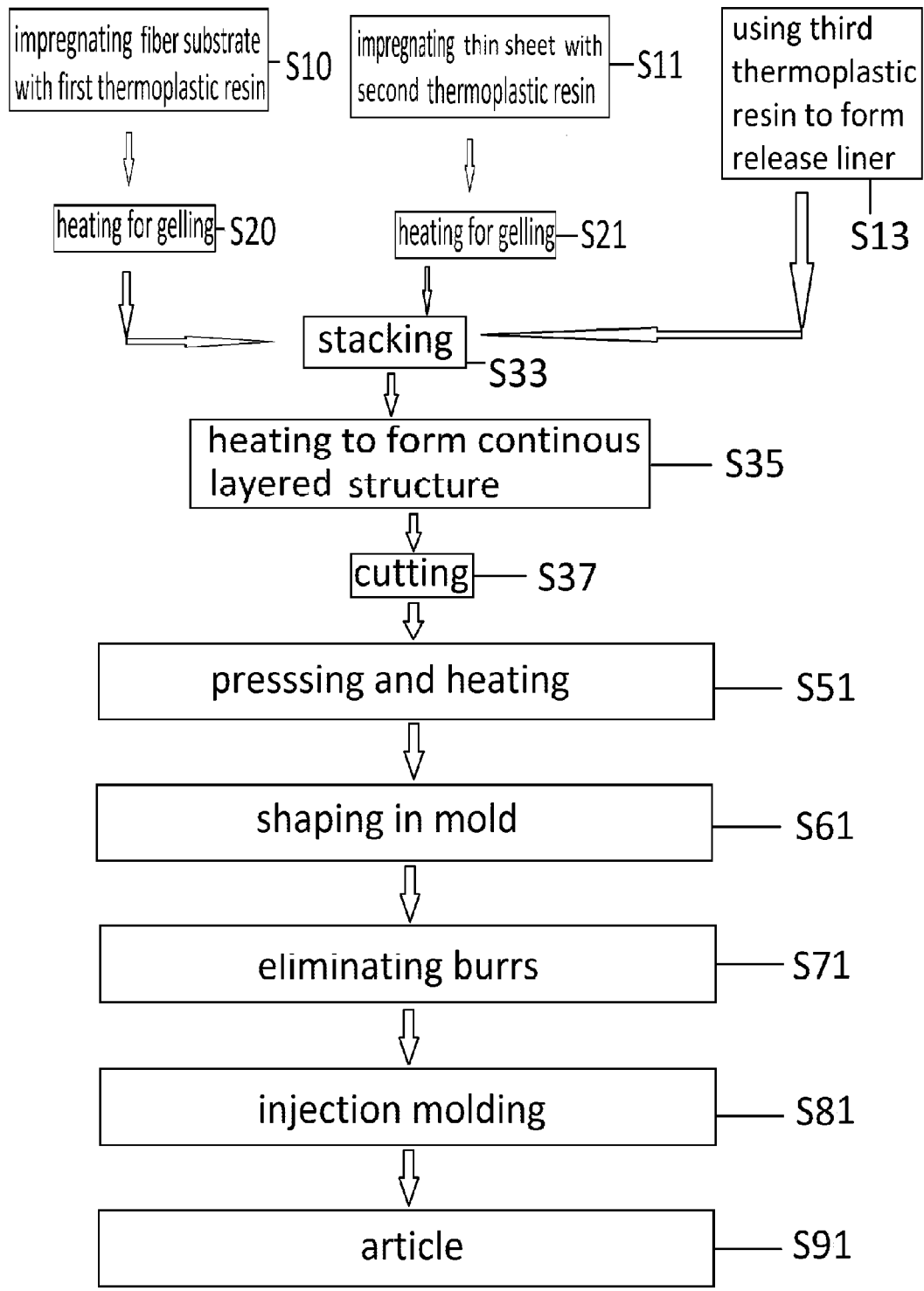
FIG. 4 is a flowchart depicting a process of manufacturing a fibrous article according to a fourth preferred embodiment of the invention.

Referring to FIG. 4, a process of manufacturing a fibrous article in accordance with a fourth preferred embodiment of the invention is illustrated. The process comprises the following steps:

In step S10, a fiber substrate is submerged in a bath of first thermoplastic resin so as to form a fiber substrate impregnated with the first thermoplastic resin and coated with a first thermoplastic resin layer.

In step S20, the fiber substrate is baked at a temperature in a range of 60° C. to 80° C. until the fiber substrate becomes a thick continuous fiber substrate.

In step S11, a thin sheet is submerged in a bath of second thermoplastic resin so as to form a thin sheet impregnated with the second thermoplastic resin and coated with a first thermoplastic resin layer.

In step S21, the thin sheet is heated at a temperature in a range of 60° C. to 80° C. until the thin sheet becomes a thick continuous thin sheet.

In step S13, a third thermoplastic resin as release agent is coated on a paper based carrier web material to form a release liner.

In step S33, the thick continuous thin sheet is stacked on the thick continuous fiber substrate, and the release liner is placed thereon subsequently.

In step S35, the stacked thin sheet and fiber substrate and the release liner are heated at a temperature in a range of 25° C. to 150° C. until a continuous layered structure is formed.

In step S37, the continuous layered structure is cut into a plurality of units of predetermined size.

In step S51, the layered structure units of predetermined number are pressed by a hydraulic press and heated at a temperature in a range of 25° C. to 150° C. until a stacked structure is formed.

In step S61, a mold is heated to a temperature of between 180° C. and 230° C., the stacked structure is conveyed to the mold to melt, the mold is cooled to cause the molten stacked structure to form a half-finished article of a predetermined shape with concave surface(s), convex surface(s), opening(s), etc. Therein, and the half-finished article is removed out of the mold.

In step S71, burrs and sharp edges of the half-finished article are eliminated by means of CNC.

In step S81, after conveying the half-finished article to the mold again, a molten fourth thermoplastic resin is uniformly applied on an inner surface of the half-finished article by injection molding in the mold.

In step S91, a fibrous article impregnated with both the first and the second thermoplastic resins and coated with the fourth thermoplastic resin on its release liner is finished.

Material of each of the first, second and third thermoplastic resins is selected from the group consisting of ABS, PS, PC, PE, AS, PMMA, PET, PA, PBT, PEEK, and PEI.

Material of the fourth thermoplastic resin is selected from the group consisting of ABS, PS, PC, PE, AS, PMMA, PET, PA, PBT, PEEK, PEI, and an additive such as at least one of Talcum powder, carbon fiber, and glass fiber.

Material of the fiber substrate is selected from the group consisting of carbon fiber, glass fiber, asbestos fiber, engineering plastic fiber, and natural fiber.

Material of the thin sheet is selected from the group consisting of bamboo, wood, fabric, metal, leather, etc.

Figure 5:
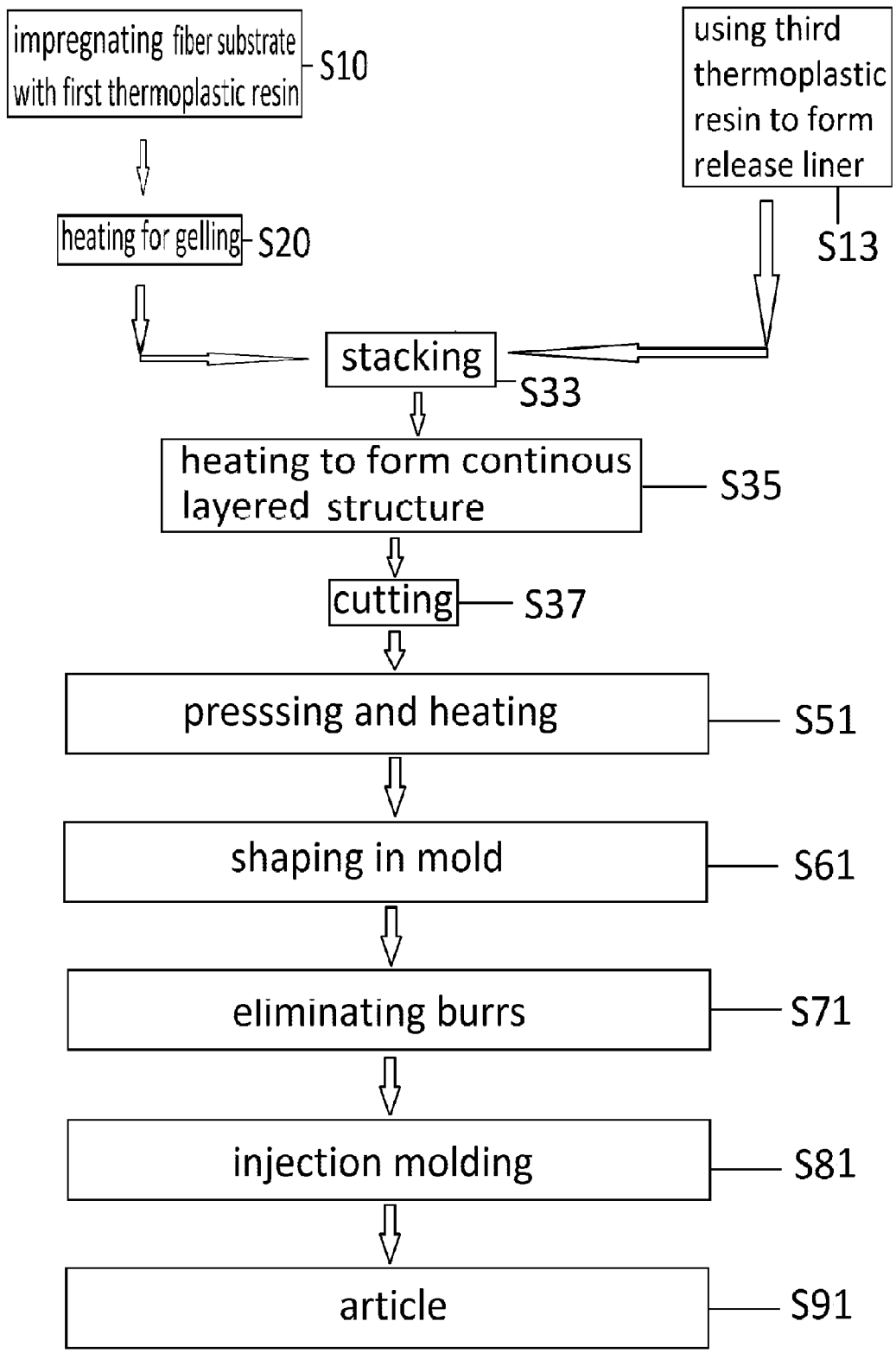
FIG. 5 is a flowchart depicting a process of manufacturing a fibrous article according to a fifth preferred embodiment of the invention.

Referring to FIG. 5, a process of manufacturing a fibrous article in accordance with a fifth preferred embodiment of the invention is illustrated. The process comprises the following steps:

In step S10, a fiber substrate is submerged in a bath of first thermoplastic resin so as to form a fiber substrate impregnated with the first thermoplastic resin and coated with a first thermoplastic resin layer.

In step S20, the fiber substrate is baked at a temperature in a range of 60° C. to 80° C. until the fiber substrate becomes a thick continuous fiber substrate.

In step S13, a second thermoplastic resin as release agent is coated on a paper based carrier web material to form a release liner.

In step S33, the release liner is stacked on the thick continuous fiber substrate.

In step S35, the stacked fibrous structure and the release liner are heated at a temperature in a range of 25° C. to 150° C. until a stacked structure is formed.

In step S37, the stacked structure is cut into a plurality of units of predetermined size.

In step S51, the stacked structure units of predetermined number are pressed by a hydraulic press and heated at a temperature in a range of 25° C. to 150° C. until a stacked fibrous structure is formed.

In step S61, a mold is heated to a temperature of between 180° C. and 230° C., the stacked fibrous structure is conveyed to the mold to melt, the mold is cooled to cause the molten stacked fibrous structure units to form a half-finished article of a predetermined shape with concave surface(s), convex surface(s), opening(s), etc. Therein, and the half-finished article is removed out of the mold.

In step S71, burrs and sharp edges of the half-finished article are eliminated by means of CNC.

In step S81, after conveying the half-finished article to the mold again, a molten third thermoplastic resin is uniformly applied on an inner surface of the half-finished article by injection molding in the mold.

In step S91, a fibrous article impregnated with both the first and the second thermoplastic resins and coated with the third thermoplastic resin on its release liner is finished.

Material of each of the first and second thermoplastic resins is selected from the group consisting of ABS, PS, PC, PE, AS, PMMA, PET, PA, PBT, PEEK, and PEI.

Material of the third thermoplastic resin is selected from the group consisting of ABS, PS, PC, PE, AS, PMMA, PET, PA, PBT, PEEK, PEI, and an additive such as at least one of Talcum powder, carbon fiber, and glass fiber.

Material of the fiber substrate is selected from the group consisting of carbon fiber, glass fiber, asbestos fiber, engineering plastic fiber, and natural fiber.

Figure 6:
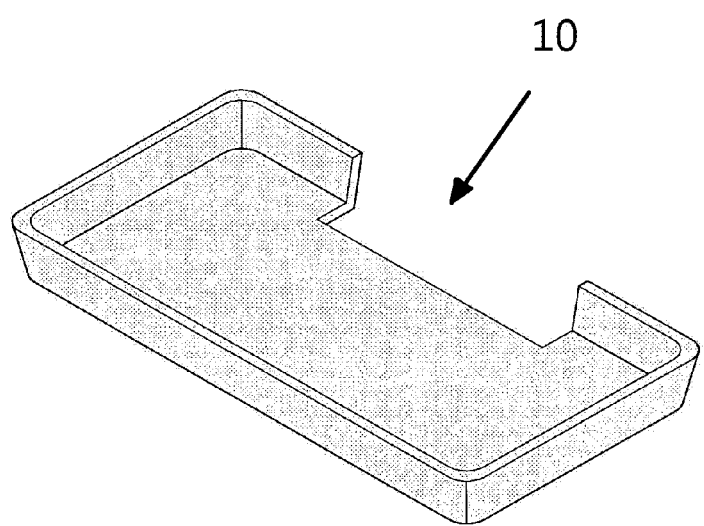
FIG. 6 is a perspective view of an open container shaped half-finished article manufactured according to any of the above preferred embodiments.

Referring to FIG. 6, a half-finished article 10 with burrs and sharp edges thereof being eliminated by means of CNC is shown.

Figure 7:
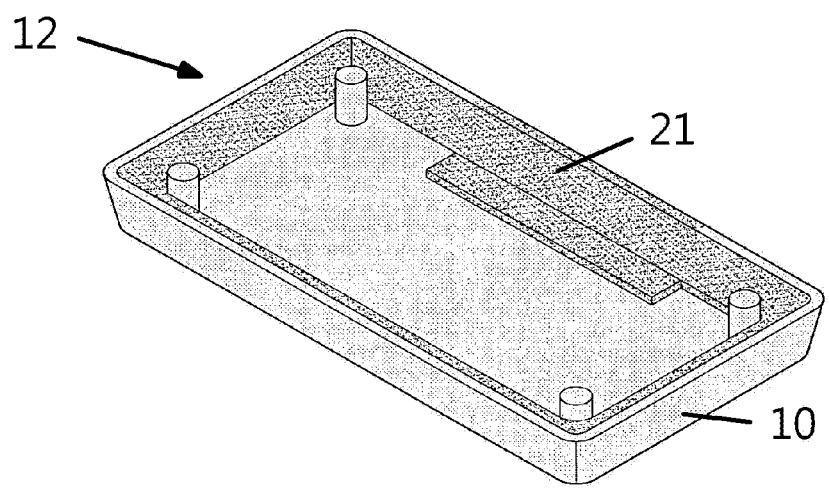
FIG. 7 is a perspective view of an open container shaped finished article manufactured according to any of the above preferred embodiments.

Referring to FIG. 7, a finished article 12 with a thermoplastic resin 21 is uniformly applied on an inner surface of the half-finished article 10 by injection molding. The thermoplastic resin 21 is the second thermoplastic resin of the first preferred embodiment or the third thermoplastic resin of the second preferred embodiment.

While the invention has been described in terms of preferred embodiments, those skilled in the art will recognize that the invention can be practiced with modifications within the spirit and scope of the appended claims.

What is claimed is:

1. A process of manufacturing a fibrous article comprising the steps of:

submerging a fiber substrate in a bath of first thermoplastic resin to impregnate the fiber substrate with the first thermoplastic resin;
heating the impregnated fiber substrate at a first temperature until the fiber substrate becomes a thick continuous fiber substrate;
cutting the thick continuous fiber substrate into a plurality of units of predetermined size;
stacking a predetermined number of the fiber substrate units;
pressing and heating the stacked fibrous structure units at a second temperature until a stacked fibrous structure is formed;
heating a mold to a third temperature;
conveying the stacked fibrous structure to the mold to melt into a molten fibrous structure;
cooling the mold to harden the molten fibrous structure into a half-finished article of a predetermined shape;
removing the half-finished article out of the mold;
eliminating burrs and sharp edges of the half-finished article;
after the step of eliminating, conveying the half-finished article to the mold; and
uniformly applying a molten second thermoplastic resin on an inner surface of the half-finished article by injection molding in the mold to produce the finished fibrous article having a second thermoplastic resin layer on an inner surface.

2. The process of claim 1, wherein the first thermoplastic resin is formed of a material selected from the group consisting of ABS (acrylonitrile butadiene styrene), PS (polystyrene), PC (polycarbonate), PE (polyethylene), AS (acrylonitrile styrene), PMMA (polymethyl methacrylate), PET (polyethylene terephthalate), PA (polyamide), PBT (polybothlene terephalate), PEEK (polyether ether ketone), and PEI (polyetherimide).

3. The process of claim 1, wherein the fiber substrate is formed of a material selected from the group consisting of carbon fiber, glass fiber, asbestos fiber, engineering plastic fiber, and natural fiber.

4. The process of claim 1, wherein the first temperature is in a range of 60° C. to 80° C., the second temperature is in a range of 25° C. to 150° C., and the third temperature is in a range of 180° C. to 230° C. respectively.

5. The process of claim 1, wherein the second thermoplastic resin is formed of a material selected from the group consisting of ABS (acrylonitrile butadiene styrene), PS (polystyrene), PC (polycarbonate), PE (polyethylene), AS (acrylonitrile styrene), PMMA (polymethyl methacrylate), PET (polyethylene terephthalate), PA (polyamide), PBT (polybothlene terephalate), PEEK (polyether ether ketone), PEI (polyetherimide), and an additive including at least one of Talcum powder, carbon fiber, and glass fiber.

* * * * *